US011802583B2

(12) United States Patent
Stevick (10) Patent No.: US 11,802,583 B2
(45) Date of Patent: Oct. 31, 2023

(54) AMORPHOUS METAL RIVET SYSTEMS AND METHODS FOR THEIR USE

(71) Applicant: LIQUIDMETAL TECHNOLOGIES, INC., Lake Forest, CA (US)

(72) Inventor: Joseph W. Stevick, Rancho Santa Margarita, CA (US)

(73) Assignee: LIQUIDMETAL TECHNOLOGIES, INC., Lake Forest, CA (US)

( * ) Notice: Subject to any disclaimer, the term of this patent is extended or adjusted under 35 U.S.C. 154(b) by 0 days.

(21) Appl. No.: 17/877,293

(22) Filed: Jul. 29, 2022

(65) Prior Publication Data

US 2022/0364588 A1 Nov. 17, 2022

Related U.S. Application Data

(62) Division of application No. 16/578,697, filed on Sep. 23, 2019, now Pat. No. 11,428,257.

(Continued)

(51) Int. Cl.
*F16B 19/10* (2006.01)
*B21J 15/02* (2006.01)
(Continued)

(52) U.S. Cl.
CPC ........... *F16B 19/1063* (2013.01); *B21J 15/02* (2013.01); *C22C 45/001* (2013.01);
(Continued)

(58) Field of Classification Search
CPC .... F16B 19/1063; F16B 19/002; F16B 21/06; F16B 19/004; F16B 19/1054;
(Continued)

(56) References Cited

U.S. PATENT DOCUMENTS 2,030,170 A * 2/1936 Huck ................. F16B 19/1054
29/523
3,685,391 A * 8/1972 Gapp ................. F16B 19/1054
411/70
(Continued)

FOREIGN PATENT DOCUMENTS

CN 104871273 A 8/2015
DE 32 12 160 A1 10/1983
(Continued)

OTHER PUBLICATIONS

SAE-AISI 4340M Silicon-Vanadium Steel, MakeitFrom.com, retrieved Feb. 9, 2023 (Year: 2023).*

(Continued)

*Primary Examiner* — Sarang Afzali
*Assistant Examiner* — Darrell C Ford
(74) *Attorney, Agent, or Firm* — FOLEY & LARNDER LLP (57) ABSTRACT

A family of rivets including both blind and bucked-type rivets made at least partially from an amorphous metal alloy. A blind rivet includes a head portion and a tail portion. At least one of the head portion and the tail portion is configured to elastically deform to secure a first member in position relative to a second member. The head portion and the tail portion may include one or more deformable legs having an interface feature configured to engage with one of the first member and the second member. A bucked-type rivet assembly includes a formable member and an anvil. The anvil is configured to thermoplastically deform the formable member proximate to the second member by passing current through an electrical circuit that includes at least one of the formable member and anvil.

20 Claims, 6 Drawing Sheets

Related U.S. Application Data (60) Provisional application No. 62/735,225, filed on Sep. 24, 2018.

(51) Int. Cl.
  *C22C 45/00* (2023.01)
  *C22C 45/10* (2006.01)
  *C22C 45/04* (2006.01)
  *C22C 45/06* (2006.01)
  *C22C 45/08* (2006.01)

(52) U.S. Cl.
  CPC ............ *C22C 45/008* (2013.01); *C22C 45/04* (2013.01); *C22C 45/06* (2013.01); *C22C 45/08* (2013.01); *C22C 45/10* (2013.01)

(58) Field of Classification Search
  CPC .. F16B 2019/055; F16B 19/1036; F16B 5/04; F16B 19/08; B21J 15/02; B21J 15/025; C22C 45/001; C22C 45/008; C22C 45/04; C22C 45/06; C22C 45/08; C22C 45/10; C22C 45/00; C22C 2200/02
  USPC .......................................................... 411/43
  See application file for complete search history.

(56) References Cited

U.S. PATENT DOCUMENTS

| | | | |
|---|---|---|---|
| 3,797,096 A * | 3/1974 | Nilsson | B21J 15/14 29/525.07 |
| 3,903,573 A | 9/1975 | Wilson | |
| 4,696,610 A | 9/1987 | Wright | |
| 5,025,128 A * | 6/1991 | Derbyshire | F16B 19/1054 156/272.4 |
| 5,067,213 A | 11/1991 | Ragsdale et al. | |
| 5,131,107 A * | 7/1992 | Pratt | F16B 19/1054 470/27 |
| 6,771,490 B2 * | 8/2004 | Peker | H05K 5/02 420/586 |
| 7,197,965 B1 * | 4/2007 | Anderson | B25B 23/0042 81/177.9 |
| 8,961,091 B2 | 2/2015 | Prest et al. | |
| 10,065,396 B2 | 9/2018 | Verreault et al. | |
| 2004/0060255 A1 | 4/2004 | Knauseder | |
| 2004/0208728 A1 | 10/2004 | Fattori et al. | |
| 2011/0020093 A1 | 1/2011 | Busch et al. | |
| 2013/0212856 A1 | 8/2013 | Winkler et al. | |
| 2013/0333165 A1 | 12/2013 | Prest et al. | |
| 2014/0017025 A1 | 1/2014 | Hemingway et al. | |
| 2014/0063786 A1 | 3/2014 | Sun | |
| 2015/0174818 A1 | 6/2015 | Mayer et al. | |
| 2017/0051774 A1 * | 2/2017 | Diehl | H01R 4/06 |
| 2017/0184142 A1 | 6/2017 | Pulsipher | |
| 2017/0217591 A1 | 8/2017 | Hirose et al. | |
| 2017/0241006 A1 * | 8/2017 | Na | C22F 1/186 |
| 2018/0009392 A1 | 1/2018 | Yokota et al. | |
| 2018/0156256 A1 | 6/2018 | Okumura | |

FOREIGN PATENT DOCUMENTS

| | | |
|---|---|---|
| DE | 10 2007 040 371 A1 | 2/2009 |
| EP | 0 372 704 B1 | 6/1990 |
| GB | 0 133 050 | 9/1973 |
| GB | 1 330 501 | 9/1973 |
| JP | S52-029368 U | 8/1975 |
| JP | 03-075344 | 3/1991 |
| JP | 40-3075344 A | 3/1991 |
| JP | 2777416 | 3/1991 |
| JP | H03-075344 A | 3/1991 |
| JP | H375344 A | 3/1991 |
| JP | H06-078610 U | 11/1994 |
| JP | 2002-273544 A | 9/2002 |
| JP | 2004-044653 A | 2/2004 |
| JP | 2015-519088 A | 7/2015 |
| JP | 2015-209854 A | 11/2015 |
| JP | 2017-503662 A | 2/2017 |
| JP | 2018-526587 | 9/2018 |
| KR | 1020130079324 | 7/2013 |
| WO | WO-2013/141878 A1 | 9/2013 |

OTHER PUBLICATIONS

Chinese First Office Action CN Application No. 201910902152.3 dated Nov. 30, 2020.

European Extended Search Report for European Patent Application No. EP 19199247.8 dated Feb. 25, 2020.

Preliminary Rejection issued in connection with KR Appl. Ser. No. 10-2022-0104789 dated Sep. 28, 2022.

European Search Report for EP Patent Application No. 19199247.8 dated May 12, 2023.

Japanese Office Action issued in connection with JP Appl. Ser. No. 2019-173140 dated Mar. 7, 2023 (12 pages).

Foreign Action other than Search Report on JP Patent Application No. 2019-173140 dated Aug. 8, 2023.

* cited by examiner

FIG. 11

AMORPHOUS METAL RIVET SYSTEMS AND METHODS FOR THEIR USE

CROSS-REFERENCE TO RELATED PATENT APPLICATIONS

This application is a divisional of U.S. patent application Ser. No. 16/578,697, filed Sep. 23, 2019, which claims the benefit of and priority to U.S. Provisional Application No. 62/735,225, filed Sep. 24, 2018, the entire disclosures of which are hereby incorporated by reference herein.

BACKGROUND

The present disclosure relates generally to the field of permanent mechanical fasteners. More specifically, the present disclosure relates to rivets, which are traditionally used to fasten together two or more metal plates. These include blind rivets applied from one side of a stack of workpieces being joined as well as standard rivets whose installation require access to both sides of the stack of workpieces.

SUMMARY

One embodiment relates to a blind rivet made at least partially from an amorphous metal alloy. The blind rivet includes a head portion and a tail portion. The tail portion includes a first leg and a second leg. The tail portion further includes a tail interface disposed on an end of each of the first leg and the second leg. The head portion is configured to engage with a first member. The tail interface for each of the first leg and the second leg is configured to engage with a second member. At least one of the first leg and the second leg is configured to elastically deform to secure the first member in position relative to the second member.

In any of the above embodiments, the head portion may be configured to deform elastically when securing the first member to the second member. In any of the above embodiments, the blind rivet may include a sleeve disposed proximate to the tail interface to facilitate installation of the blind rivet.

In some embodiments, the blind rivet may include a third leg and a fourth leg, both disposed on the head portion. The blind rivet may further include a pulling member disposed proximate to the third leg and the fourth leg, the pulling member configured to facilitate installation of the blind rivet.

Another embodiment relates to a bucked-type rivet assembly. The bucked-type rivet assembly includes a formable member made from an amorphous metal alloy. An anvil configured to facilitate installation of the formable member is at least partially disposed in a channel through the formable member. The anvil includes an interface shaft and an anvil head disposed on a first end of the interface shaft. The formable member is configured to secure a first member in position relative to a second member. The anvil head is configured to plastically deform the formable member proximate to the second member. The anvil head is further configured to separate from the interface shaft upon application of a predetermined tensile force to the interface shaft.

In some embodiments, the bucked-type rivet assembly may form an electrical circuit that includes at least one of the anvil and the formable member.

In some embodiments, the formable member may be heated by exciting the anvil ultrasonically or spinning the anvil rapidly across one or more surfaces of the formable member.

Another embodiment relates to a method of installation for a bucked-type rivet. The method includes inserting a formable member through a first aperture in a first member and a second aperture in a second member. The method also includes inserting an anvil into a channel in the formable member. The anvil includes an interface shaft and an anvil head disposed on a first end of the interface shaft. The anvil additionally includes an insulating layer disposed on an outer surface of the interface shaft. The method further includes passing current through an electrical circuit including the interface shaft, the anvil head, and the formable member. The method additionally includes pulling on the interface shaft to deform a portion of the formable member. The method also includes breaking the interface shaft.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Traditionally, rivets are made from materials that are harder than those being joined. However, the growing use of high-strength alloys has made finding a suitable rivet material problematic. Many of the failure modes typically associated with riveted joints, including excessive tensile stresses, shear stresses, and pull out of the rivet from the joint, may be addressed with improved material properties of the rivet and also better contact force mechanics between the rivet and workpieces being joined.

Referring generally to the figures, a family of rivets is provided. The rivets are made at least partially from an amorphous metal alloy such as bulk metallic glass (BMG). Two types of rivets are provided, including elastic brad-type rivets (e.g., a blind rivet inserted from one side of a stack of workpieces being joined) and standard or bucked-type rivets, which are secured in position by plastically deforming at least one end of the rivet. The design of the elastic brad-type rivets leverages the unique properties of BMG, a material that is able to accommodate large amounts of elastic deformation, to secure together two or more workpieces (e.g., metal plates). The elastic brad-type rivets may be mechanically compressed and inserted through a joining hole in the workpieces. A set of barb-like features on a tail end of each of the brad-type rivets deploys near an outer edge of the joining hole, which locks the rivet in place. Elastic deformation of the tail end of each brad-type rivet results in a tensile force that locks the workpieces together.

Each rivet in a family of bucked-type rivets disclosed herein is secured in place by thermoplastically deforming a portion of the rivet, either on one or both sides of a stack of workpieces. Accordingly, installation procedures generally require access to both sides of the stack of workpieces being joined. A riveting tool or other applicator device is used to facilitate installation of each of the bucked-type rivets. For example, the riveting tool may generate an electrical current through the BMG to rapidly heat the BMG while simultaneously applying a force or pressure to thermoplastically deform a portion of the rivet. This particular bucked-type rivet design lends itself to use with a gas or liquid delivery system to quickly cool the rivet after the forming process is complete.

The riveting tool may interface with a sacrificial piece of material or anvil through which the force is transmitted to the bucked-type rivet. As an alternative to heating the material using an electrical current, the riveting tool may heat the material by spinning the anvil rapidly across the surface of the rivet, applying ultrasonic energy to the anvil, or otherwise mechanically exciting the anvil. The details of the general depictions provided above will be more fully explained by reference to FIGS. 1-10.

Figure 1:
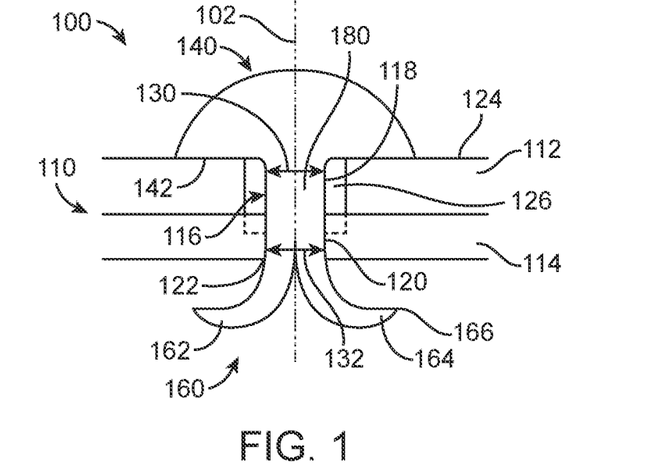
FIG. 1 is a side view of a blind rivet at a cross-section through a plane parallel to an axis of the blind rivet, according to an illustrative embodiment.

Referring now to FIG. 1, a blind rivet, shown as brad rivet 100, is provided. The brad rivet 100 is a permanent mechanical fastener configured to secure two or more workpieces in position relative to one another. There are a wide variety of potential applications for the brad rivet 100. In one embodiment, the brad rivet 100 is used to secure a series of metal plates together for the hull of a ship. In other embodiments, the brad rivet 100 is used to secure thin aluminum plates together in the construction of an aircraft cockpit and fuselage. The brad rivet 100 provides a viable alternative to welding and bolting, particularly for projects where the final weight of the bonded workpieces is a key consideration.

In an illustrative embodiment, the brad rivet 100 is configured to secure two workpieces (e.g., steel or aluminum plates, etc.) together in a stack, shown as stack 110. In alternative embodiments, the number of workpieces being joined may be greater. The stack 110 includes a first member, shown as first metal plate 112 and a second member, shown as second metal plate 114, that are arranged in direct contact with one another. The thickness of each metal plate may vary depending on structural requirements. In the embodiment of FIG. 1, the metal plates 112, 114 are approximately equal in thickness. As shown in FIG. 1, the brad rivet 100 is inserted through an aperture 116 that extends through each of the first metal plate 112 and the second metal plate 114. In the embodiment of FIG. 1, the aperture 116 includes a first aperture 118 disposed in the first metal plate 112 and a second aperture 120 disposed in the second metal plate 114. Both the first aperture 118 and the second aperture 120 are circular holes. The first aperture 118 has a diameter that is greater than the second aperture 120 to accommodate a sleeve 126 for the brad rivet 100. In other embodiments, the size and shape of each of the first aperture 118 and the second aperture 120 may be different.

A variety of suitable amorphous metal alloys may be used for the brad rivet 100. In particular, amorphous metal alloys including BMG alloys and/or crystalline metals characterized by a very large elastic limit and a high tensile strength may be used. Advantageously, BMG alloys with a large elastic limit (the upper range of strain an elastic material can handle before failure) enable the brad rivet 100 to be compressed into smaller apertures and deploy into a larger state for maximum gripping/clamping/holding power. A suitable BMG alloy may have an elastic limit of about 2% strain or greater, which is about four times higher than typical crystalline metals. Among various alternatives, the amorphous metal alloy may comprise a zirconium-based BMG alloy or a nickel-based BMG alloy, both of which have a low manufacturing cost. Alternatively, or in addition, it may be desired to have a material with improved fatigue life to avoid failure of the brad rivet 100 due to vibration or stress corrosion in atmospheric or more corrosive environments such as seawater.

In the illustrative embodiment shown in FIG. 1, the brad rivet 100 includes a head portion, shown as head 140, and a tail portion, shown as tail 160, disposed at an opposite end of the brad rivet 100. The brad rivet 100 further includes a shaft, shown as cylindrical extension 180, disposed between the head 140 and the tail 160. As shown in FIG. 1, the head 140 of the brad rivet 100 is formed in a domed shape having a planar lower surface, shown at flat lower surface 142, that is arranged in contact with an outer surface 124 of the first metal plate 112. In other embodiments, the shape of the head 140 may be different. For example, the head 140 could be in the shape of a rectangle with uniform cross-section. Alternatively, the head 140 could be circular with uniform cross-section or any other shape that suitably interfaces with the first metal plate 112 and prevents the brad rivet 100 from passing through the first aperture 118.

As shown in FIG. 1, the tail 160 of the brad rivet 100 includes two legs, a first leg 162 and a second leg 164, which are curved away from one another (e.g., peeled back toward the head 140 of the brad rivet 100). In the embodiment of FIG. 1, the first and second legs 162, 164 are in a shape formed by splitting the cylindrical extension 180 along a plane oriented parallel to a longitudinal axis 102 of the brad rivet 100, resulting in legs 162, 164 that each have a substantially semi-circular cross-sectional shape. Other embodiments may include more legs, each having a similar cross-sectional area. Alternatively one or more legs may be larger or smaller than the other legs.

According to an illustrative embodiment, each of the first leg 162 and the second leg 164 include a tail interface, shown as barb 166, configured to engage with the second metal plate 114. Once installed, the barb 166 prevents the brad rivet 100 from being removed from either the first or second apertures 118, 120. The barb 166 is a small projection that extends outward and away from the longitudinal axis 102 of the brad rivet 100. For example, the barb may be a sharp point, a ridge configured to dig into a material, a hook shaped extension configured to grab or lock onto an outer edge of a material, or any combination thereof. During installation, the first and second legs 162, 164 are held proximate to one another in compression by at least one of the first aperture 118 and the second aperture 120. Once the brad rivet 100 is inserted past a predetermined point, the first leg 162 and the second leg 164 deploy (e.g., separate away from one another), latching onto the second metal plate 114 at a location that is proximate to an outer edge 122 of the second aperture 120 (e.g., at a location that is just beyond the outer edge 122 or at another anchoring point along an interior surface of the second aperture 120). In the embodiment shown in FIG. 1, a separation distance 168 between the first leg 162 and the second leg 164 increases as the head 140 of the brad rivet 100 moves closer to the outer surface 124 of the first metal plate 112.

The brad rivet 100 takes advantage of the high elastic limit of BMG in a geometry that can be compressed, inserted through the joining aperture, and secured in position by nature of the resulting forces on the brad rivet 100. The brad rivet is shown in an installed position in FIG. 1. In the embodiment of FIG. 1, elastic tensile forces generated in the rivet are configured to secure the first member in position relative to the second member. The separation of the first and second legs 162, 164 beyond the outer surface of the second metal plate 114, generates a tensile force on the brad rivet 100. This tensile force acts to prevent the first metal plate 112 and the second metal plate 114 from separating from one another and from separating from the head 140 of the brad rivet 100. Although the compressive force acting on the first and second legs 162, 164 is reduced when the brad rivet 100 is fully installed, there remains an amount of compression that maintains the legs 162, 164 in solid contact with the second metal plate 114, even when stresses or vibrations are applied to the joined workpieces.

Figure 2A:
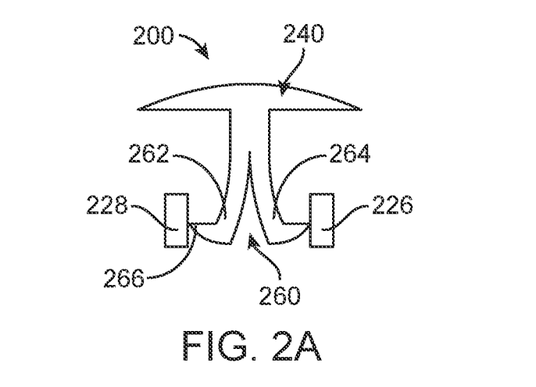
FIG. 2A is a side view of a blind rivet with a deformable head portion, shown at a cross-section through a plane parallel to an axis of the rivet, according to an illustrative embodiment.

Advantageously, installation of the brad rivet 100 requires access to only one side of the stack 110. In an illustrative embodiment, the brad rivet 100 is inserted into the first aperture 118 by compressing each of the first leg 162 and the second leg 164 toward one another (e.g., toward the longitudinal axis 102 of the brad rivet 100), thereby reducing the separation distance 168 between the first and second legs 162, 164 such that an outer diameter of the tail 160 is less than an inner diameter of the second aperture 120. There are a variety of tools that may be used to compress the first and second legs 162, 164. In the embodiment of FIGS. 1 and 2A, a compressive force is applied by placing a sleeve 126, 226 around the tail 160, 260 of the brad rivet 100. The sleeve 126, 226 is a device configured to position the legs 162, 164, 262, 264 before installation of brad rivet 100, 200. For example, the sleeve may be any one of a hollow cylinder, a removable C-clip or clasp, or a combination thereof. The sleeve 126, 226 in FIGS. 1 and 2A takes the form of a short hollow cylinder. As shown in FIG. 2A, before inserting the brad rivet 200 into the first aperture 118, the sleeve 226 is centered on the barbs 266 such that the barbs 266 contact an inner surface 228 of the sleeve 226. Alternatively, the sleeve 226 may be disposed on a portion of the tail 260 just above the barbs 266, in which case the barbed portion of the tail 260 may be used to help center the brad rivet 200 with respect to at least one of the first aperture 118 and the second aperture 120 prior to installation.

As shown in FIG. 1, the sleeve 126 of the brad rivet 100 is configured to facilitate installation of the brad rivet 100. In the embodiment of FIG. 1, a diameter of the first aperture 118, shown as first aperture diameter 130, is greater than a diameter of the second aperture 120, shown as second aperture diameter 132. The sleeve 126 is configured to engage with the first aperture 118. Additionally, the sleeve 126 aligns the brad rivet 100 with the center of the first aperture 118. In an illustrative embodiment, a height of the sleeve 126 may be less than or equal to a thickness of the first metal plate 112 so that the sleeve 126 may be fully inserted into the first aperture 118. In other embodiments, the height of the sleeve 126 is greater than the thickness of the first metal plate 112 and is engageable with both the first aperture 118 and a slot 134 in the second metal plate 114 (thereby aligning the brad rivet 100 with the center of the second aperture 120). In yet other embodiments, the brad rivet 100 is installed without a sleeve 126. For example, the first aperture diameter 130 may be sized to receive a curved edge 170 of the barbs 166, the curved edge 170 configured to guide each of the first leg 162 and the second leg 164 together toward the longitudinal axis 102 of the brad rivet 100 as the tail 160 enters the first aperture 118.

In an illustrative embodiment, a driving tool (e.g., a hammer or other driving tool configured to force the tail 160 of the brad rivet 100 into the second aperture 120) is used to secure the brad rivet 100 in position relative to the metal plates 112, 114. A method of installation for the brad rivet 100 includes inserting the sleeve 126 into the first aperture 118 and using the driving tool to force the tail 160 of the brad rivet 100 out of the sleeve 126 and into the second aperture 120 (e.g., by repeatedly contacting the head 140 of the brad rivet 100 with the driving tool). During installation, the sleeve 126 remains fixed in position relative to the metal plates 112, 114. Installation of the brad rivet 100 is complete once the flat lower surface 142 of the head 140 contacts the first metal plate 112.

In an illustrative embodiment (not shown), at least one of the first aperture diameter 130 and the second aperture diameter 132 may be larger than an outer diameter of the cylindrical extension 180 between the head 140 and the tail 160 of the brad rivet 100. This additional space (e.g., a small annular gap between the brad rivet 100 and the workpieces being joined) is at least partially accommodated by the large amount of elastic displacement of the first and second legs 162, 164 of the brad rivet 100.

Figure 2B:
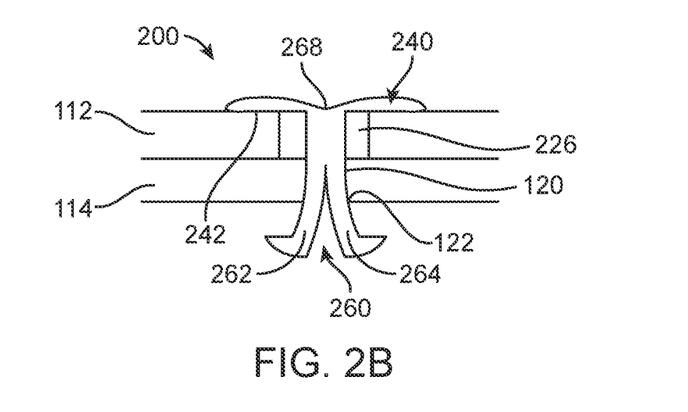
FIG. 2B is a side view of the blind rivet of FIG. 2A securing together a stack of workpieces, according to an illustrative embodiment.

FIGS. 2A and 2B show an illustrative embodiment of a brad rivet 200 including a head portion, shown as head 240, that is configured to deform elastically. As shown in FIG. 2A, the head 240 of the brad rivet 200 is formed in a domed shape having a planar lower surface, shown as flat lower surface 242. The brad rivet 200 includes a pair of legs, a first leg 262, and a second leg 264, disposed on a tail portion, shown as tail 260, of the brad rivet 200. Prior to installation, as shown in FIG. 2A, each of the first leg 262 and the second leg 264 are compressed together toward a longitudinal axis for the brad rivet 200 by a sleeve 226.

The methods used for the installation of the brad rivet 100 of FIG. 1 may also be used for the installation of the brad rivet 200 of FIG. 2A. FIG. 2B shows the same brad rivet 200 as FIG. 2A, after joining the first metal plate 112 and the second metal plate 114. As shown in FIG. 2B, the first leg 262 and second leg 264 are deployed (e.g., separated from one another) beyond an outer edge 122 of the second aperture 120. The first leg 262 and the second leg 264 contact the outer edge 122 of the second aperture 120, preventing the brad rivet 200 from being pulled back through the second aperture 120.

In the embodiments of FIGS. 2A and 2B, a portion of the elastic tensile force generated within the brad rivet 200 results from deformation of the head 240. During installation of the brad rivet 200, as shown in FIG. 2B, a portion of the head 240 deforms elastically, resulting in recessed portion, shown as dimple 268, in the head 240. As the head 240 returns to its original geometry (shown in FIG. 2A), the metal plates 112, 114 are brought together by the elastic tensile forces generated in the brad rivet 200. In other words, the combined deformation of the head 240 and the first and second legs 162, 164 generates an elastic tensile force within the brad rivet 200 that compresses the metal plates 112, 114 together between the head 240 and the tail 260.

Figure 3A:
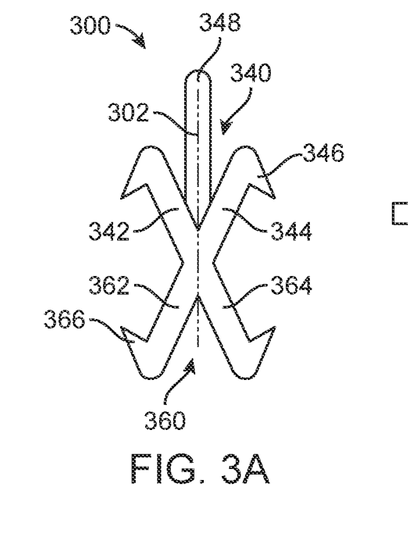
FIG. 3A is a side view of a blind rivet that includes deformable legs on both a head portion and a tail portion of the blind rivet, shown at a cross-section through a plane parallel to an axis of the blind rivet, according to an illustrative embodiment.
Figure 3B:
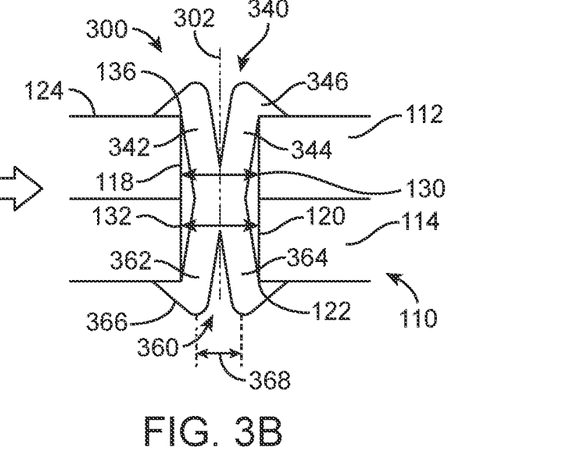
FIG. 3B is a side view of the blind rivet of FIG. 3A securing together a stack of workpieces, according to an illustrative embodiment.

Yet another illustrative embodiment of a brad rivet 300 is shown in FIGS. 3A and 3B. As shown in FIG. 3A, the brad rivet 300 includes a head 340 and a tail 360, each including a set of deformable legs. A first leg 362 and a second leg 364 are disposed proximate to the tail 360 of the brad rivet 300, while a third leg 342 and a fourth leg 344 are disposed proximate to the head 340. Like the brad rivets 100, 200 of FIGS. 1, 2A, and 2B, each of the legs 362, 364, 342, 344 includes an interface feature configured to engage with the second metal plate 114. Each of the first leg 362 and the second leg 364 of the brad rivet 300 includes a tail interface, shown as tail barb 366, while each leg 342, 344 on the head 340 of the brad rivet 300 includes a head interface, shown as head barb 346. The brad rivet 300 also includes a pulling member, shown as breakstem 348 (see FIG. 3A), centered between the third leg 342 and the fourth leg 344. As shown in FIG. 3A, the breakstem 348 extends away from the tail 360 of the brad rivet 300 along a longitudinal axis 302 of the brad rivet 300.

The breakstem 348 is configured to engage with an applicator device to facilitate installation of the brad rivet 300. A method of installing the brad rivet 300 includes engaging each of the tail barbs 366 with the second metal plate 114 proximate to the outer edge 122 of the second metal plate 114. This may be accomplished by first securing a sleeve (not shown) along the length of the brad rivet 300, the sleeve configured to compress the each of the legs 362, 364, 342, 344 toward the longitudinal axis 302 of the brad rivet 300. In an illustrative embodiment, the sleeve 330 is a hollow cylinder that extends along the entire length of the brad rivet 300 (e.g., the sleeve oriented such that a central axis of the sleeve is substantially parallel to the longitudinal axis 302). In an illustrative embodiment, the inner diameter of the sleeve is approximately the same as the first and second aperture diameters 130, 132. The method includes centering the central axis of the sleeve 330 with respect to a central axis of the first aperture 118 and ejecting the brad rivet 300 from the sleeve 330 directly into the first and second aperture 118, 120.

The method further includes pulling back on the breakstem 348 (e.g., away from the tail 360 of the brad rivet 300 in a direction perpendicular to an outer surface 124 of the first metal plate 112), which compresses the first leg 362 and the second leg 364 together toward the longitudinal axis 302 of the brad rivet 300. The brad rivet 300 elongates as a separation distance 368 between the first leg 362 and the second leg 364 decreases. This process continues until each of the third leg 342 and the fourth leg 344 engage with the first metal plate 112 proximate to an edge of the first metal plate 112, shown as upper edge 136. The method concludes by separating the breakstem 348 from the brad rivet 300, by bending, twisting, or upon application of a predetermined force by the applicator device.

Figure 4:
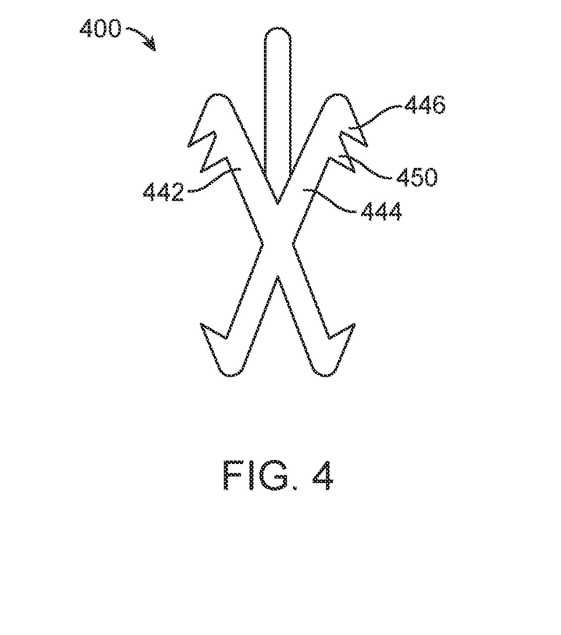
FIG. 4 is a side view of a blind rivet that includes a second set of barbs on a head portion of the blind rivet, shown at a cross-section through a plane parallel to an axis of the blind rivet, according to an illustrative embodiment.

In the illustrative embodiment shown in FIG. 4, the head interface for each leg 442, 444 of the brad rivet 400 includes a plurality of barb-like features. As shown in FIG. 4, the head interface further includes a second head barb 450 disposed just below head barb 446 on the tail facing side of the head barb 446. Similar to head barb 446, the second head barb 450 is a small projection that extends away from either the third leg 442 or fourth leg 444 in a direction that is substantially perpendicular to one of the third leg 442 and the fourth leg 444. Using multiple head barbs 446, 450 permits the brad rivet 400 to be tightened by discrete amounts during installation. Among the various benefits, multiple head barbs 446, 450 allow a single brad rivet 400 design to accommodate workpieces of varying thickness. Using multiple head barbs 446, 450 also provides a mechanism for adjustment of the tensile forces that secure the workpieces together.

In various illustrative embodiments, the method of installation of the brad rivet 300, 400 may be different. For example, transferring the brad rivet 300, 400 from the sleeve into one of the first and second apertures 118, 120 may be greatly simplified in an embodiment where a user is provided access to both sides of the stack 110 of joined workpieces. Furthermore, the length and geometry of the sleeve may be altered depending on the material properties and geometry of the brad rivet 300, 400.

A variety of geometries are contemplated for the head interface. In one embodiment, the head interface takes the form of a saw tooth pattern along a surface of each of the third leg and fourth leg. In another embodiment, the head interface is formed in the shape of a hook or another geometry that is configured to latch or engage with the first metal plate 112.

Figure 5:
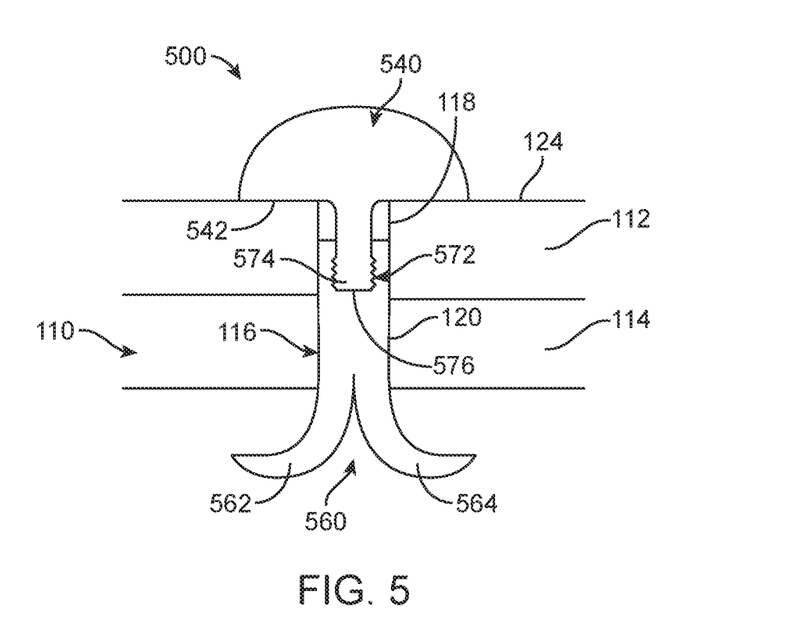
FIG. 5 is a side view of a two-piece blind rivet, at a cross-section through a plane parallel to an axis of the blind rivet, according to an illustrative embodiment.

An additional illustrative embodiment of a brad rivet 500 is generally depicted in FIG. 5. Again, the brad rivet 500 includes a head portion, shown as head 540 and a tail portion, shown as tail 560, which is disposed on an opposite end of the brad rivet 500 as the head 540. As shown in FIG. 5, the head 540 and tail 560 are separate components that engage with one another via a threaded interface 572. Like the brad rivets 100, 200 of FIGS. 1, 2A and 2B, the head 540 of the brad rivet 500 is formed in a domed shape having a planar lower surface, shown at flat lower surface 542. During installation, the flat lower surface 542 is brought into contact with the outer surface 124 of the first metal plate 112. The threaded interface 572 includes a threaded extension 574 disposed centrally on the flat lower surface 542 of the head 540. The threaded extension 574 is received within a threaded hole 576 on the tail 560.

In the embodiment of FIG. 5, the tail 560 and head 540 of the brad rivet 500 are both made from BMG, although the head is not configured to deform elastically. Alternatively, the head may be made from another material (e.g., a steel alloy, etc.). Again, the tail 560 includes a first leg 562 and a second leg 564 that are configured to elastically deform or deploy on an opposite end of the stack 110 of workpieces once inserted into the aperture 116. As shown in FIG. 5, the tail 560 extends through the second aperture 120 and a portion of the first aperture 118. In other embodiments, the tail 560 extends through only a portion of the first aperture 118.

Advantageously, the tensile forces generated by the brad rivet 500 of FIG. 5 may be easily adjusted via the threaded interface 572 after installation. In an illustrative embodiment, the head 540 may include a fastener interface configured to engage with a fastening tool. In one embodiment, the fastener interface is one of a variety of types of screw drive (e.g., hex, slot drive, etc.). In another embodiment, the head 540 is a hex head cap screw or another type of bolt.

Figure 6:
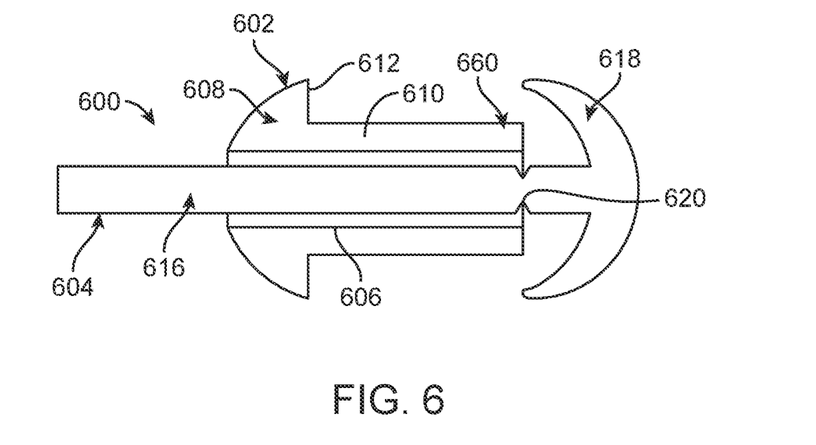
FIG. 6 is a bucked-type rivet and forming piece, at a cross-section through a plane parallel to an axis of the bucked-type rivet, according to an illustrative embodiment.

An illustrative embodiment of a bucked-type rivet assembly, shown as rivet assembly 600, is provided in FIG. 6. The rivet assembly 600 includes a formable member, shown as rivet piece 602 and an anvil, shown as forming piece 604. The forming piece 604 is configured to be received within a channel 606 of the rivet piece 602. The rivet piece 602 is shown isolated from the forming piece 604 in FIG. 7A, while the forming piece 604 is shown isolated from the rivet piece 602 in FIG. 7B.

Figure 7A:
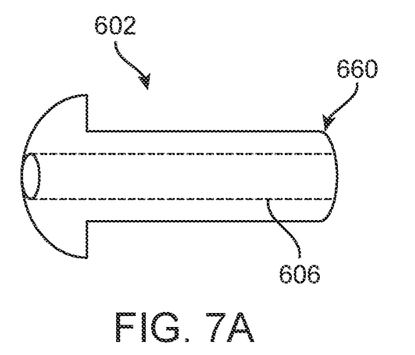
FIG. 7A is a side perspective view of the bucked-type rivet of FIG. 6.

As shown in FIG. 7A, the rivet piece 602 includes a head portion, shown as head 608, disposed on a first end of a shaft, shown as cylindrical extension 610. In an illustrative embodiment, the rivet piece 602 is formed as a single piece from an amorphous metal alloy. As with the brad rivets shown in FIGS. 1, 2A-2B, and 5, the head 608 of the rivet piece 602 is formed in a domed shape having a planar lower surface, shown at flat lower surface 612, that is configured to contact one of the first metal plate 112 and the second metal plate 114 (also see FIGS. 9-10). The cylindrical extension 610 of the rivet piece 602 has an outer diameter that is sized to fit within both the first aperture 118 and the second aperture 120 simultaneously.

A variety of suitable amorphous metal alloys may be used for the rivet piece 602. Amorphous metal alloys having a reasonably large thermoplastic processing window or supercooled liquid region are particularly appealing for this application. The subcooled liquid region (ΔTx) is defined as a separation (e.g., temperature difference) between a temperature (Tx) associated with the onset of crystallization and the glass transition temperature (Tg). Suitable amorphous metal alloys may include a BMG alloy having a subcooled liquid region ΔTx=Tx−Tg within a range between about 20° C. and 130° C. or greater. Other possible candidates include titanium, iron, and nickel-based BMG alloys. Yet other possible candidates include zirconium-based BMG, which may be alloyed with one, or a combination of, copper, nickel, titanium, aluminum, and beryllium. The zirconium BMG may also be alloyed with one or more group three elements as minor alloying additions such as Yttrium and Scandium to improve the viability of commercial-scale production.

Figure 7B:
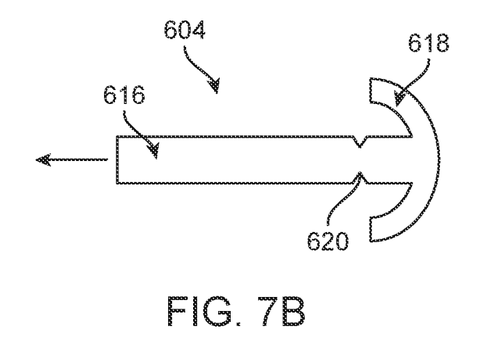
FIG. 7B is a side view of the forming piece of FIG. 6.

In the embodiment of FIGS. 6 and 7B, the forming piece 604 is configured to be at least partially disposed in an opening, shown as channel 606, that extends along a central axis of the rivet piece 602. As shown in FIG. 7B, the forming piece 604 includes an interface shaft, shown as puller shaft 616 having a first end and a second end. The forming piece 604 also includes an anvil head, shown as forming head 618, disposed on a first end of the puller shaft 616. A portion of the puller shaft 616 is configured to separate from the forming piece 604 upon application of a predetermined tensile force to the puller shaft 616. A separation point, shown as notch 620, is disposed at an axial position along the length of the puller shaft 616 proximate to the forming head 618. The notch 620 is configured to weaken the puller shaft 616 so that it breaks upon application of a predetermined force. The notch 620 may be any one of a variety of different geometries; for example, the notch 620 may be a v-shaped channel, a u-shaped channel, a rectangular channel, or any combination thereof. In the illustrative embodiment of FIGS. 6 and 7B, the notch 620 is a v-shaped channel that extends around the perimeter of the puller shaft 616.

The forming head 618 is configured to plastically deform the tail 660 of the rivet piece 602. In an illustrative embodiment, the forming piece 604 is made from an electrically conductive material having a larger cross-sectional area than the rivet piece 602 along the path of current flow to reduce Joule heating within the forming piece 604. The forming piece 604 may also be made from a material with a higher melting point than the BMG to prevent the forming piece 604 from plastically deforming with the tail 660 and/or before the tail 660.

A variety of different materials may be used for the forming piece 604, including steels and hard copper beryllium alloys, both of which have electrical conductivities that are higher than BMG. Suitable steel alloys may have electrical conductivities of approximately 10% of the International Annealed Copper Standard (IACS) or greater, whereas suitable copper beryllium alloys may have electrical conductivities within a range between 15-45% IACS or greater. Both of these alloy families also have relatively high thermal conductivity, which is necessary in order to quench the BMG back down below the glass transition temperature (Tg) before devitrification can occur. Another example of a suitable materials for the forming piece 604 are aluminum alloys. Among other benefits, aluminum alloys tend to be less expensive, have lower hardness, but higher electrical and thermal conductivities for more efficient and faster heating and cooling operations. Although aluminum alloys are not as hard as copper or steel alloys, above Tg the BMG alloys significantly soften and become viscous, so although wearing and deformation of the anvil will occur over time, the aluminum based forming piece 604 could potentially be a more economical solution in some implementations. More complex designs for the forming piece 604 are also feasible to deliver the electrical current more efficiently to the BMG. For example, a very high electrical conductivity pathway (such as a wire) could be incorporated into a pocket and/or opening disposed in the forming piece to deliver the electrical current directly to the surface of the rivet instead of requiring the current to travel through the forming piece 604 for heating. The high conductivity pathway may be insulated from the forming piece 604. Alternatively, the forming piece 604 may be configured such that a portion of the current flows through the forming piece 604, while simultaneously a portion of the current flows through the high electrical conductivity pathway.

The forming head 618 of FIGS. 6 and 7B is formed in a U-shape when viewed in cross-section, whose ends curve back toward the puller shaft 616. In other embodiments, the forming head 618 may be formed in a T-shape when viewed in cross-section (see FIGS. 9-10), or another shape that suitably forms the rivet piece 602 around the outer edge 122 of the second aperture 120. As shown in FIG. 6, a second end of the puller shaft 616, opposite the forming head 618, is configured to be received within the channel 606. As shown in FIG. 6, the second end of the puller shaft 616 extends beyond the head 608 of the rivet piece 602 along a central axis of the rivet piece 602 and is configured to be received within an applicator device, shown as rivet tool 622 (see FIG. 8).

Figure 8:
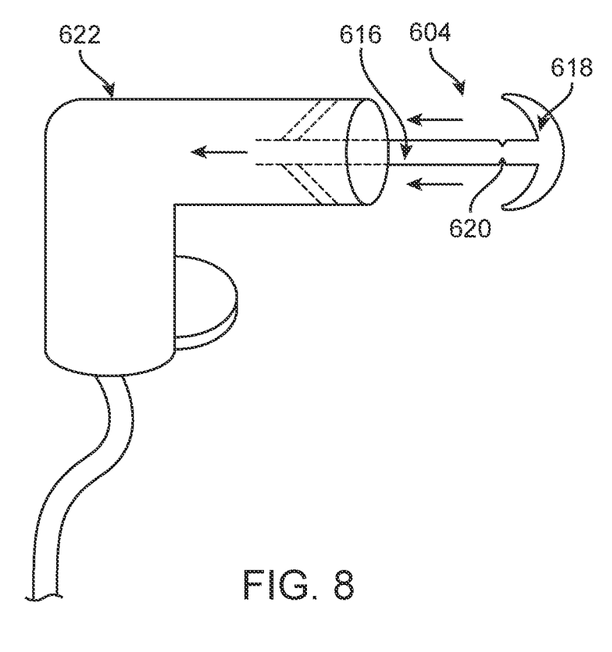
FIG. 8 is a side perspective view of an applicator device for a bucked-type rivet, according to an illustrative embodiment.
Figure 9:
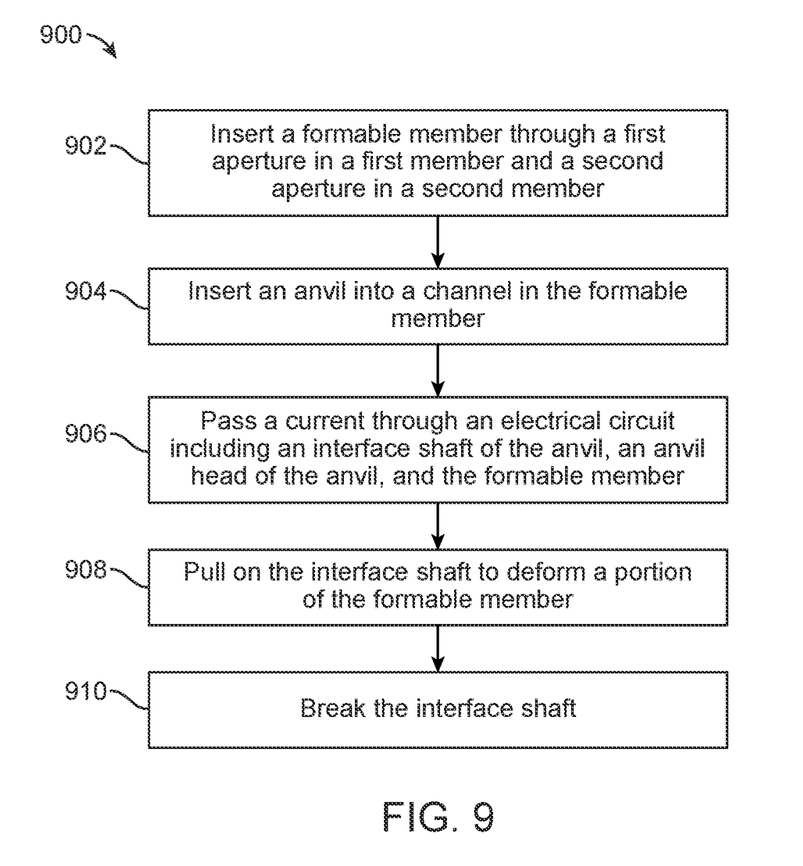
FIG. 9 is a flow chart outlining a method according to an exemplary embodiment.

A flow diagram of a method 900 of installing a rivet assembly is shown in FIG. 9, according to an illustrative embodiment. The rivet assembly may be the same or similar to the rivet assembly 600 described with reference to FIGS. 6-8. For simplicity, similar numbering will be used to identify similar components. The method 900 is illustrated conceptually in FIGS. 10 and 11. The method 900 includes inserting the cylindrical extension 610 of the rivet piece 602 through the first aperture 118 and the second aperture 120, at 902, such that the flat lower surface 612 of the head 608 contacts an outer surface 124 of the first metal plate 112. The method 900 further includes inserting the forming piece 604 into the channel 606 of the rivet piece 602 from an opposite side of the stack 110 (e.g., from the second metal plate 114 toward the first metal plate 112), at 904, such that the forming head 618 is brought into contact with the cylindrical extension 610.

A variety of techniques may be used to deform the rivet piece 602 using the forming piece 604. For example, the rivet piece 602 may be heated to a forming temperature based on the size and material composition of the rivet piece 602 and then deformed using the forming piece 604. In order to heat the rivet piece 602, the rivet tool 622 (see FIG. 8) may incorporate resistive heaters or another suitable heating device. Alternatively, the rivet tool 622 may be configured to rapidly excite the forming piece 604 while it is in contact with the rivet piece 602. For example, the rivet tool 622 may be configured to excite the forming piece 604 using ultrasonic energy. Alternatively, the rivet tool 622 may be configured to rapidly spin the forming piece 604 to generate heat at the interface between the forming piece 604 and the rivet piece 602.

Figure 10:
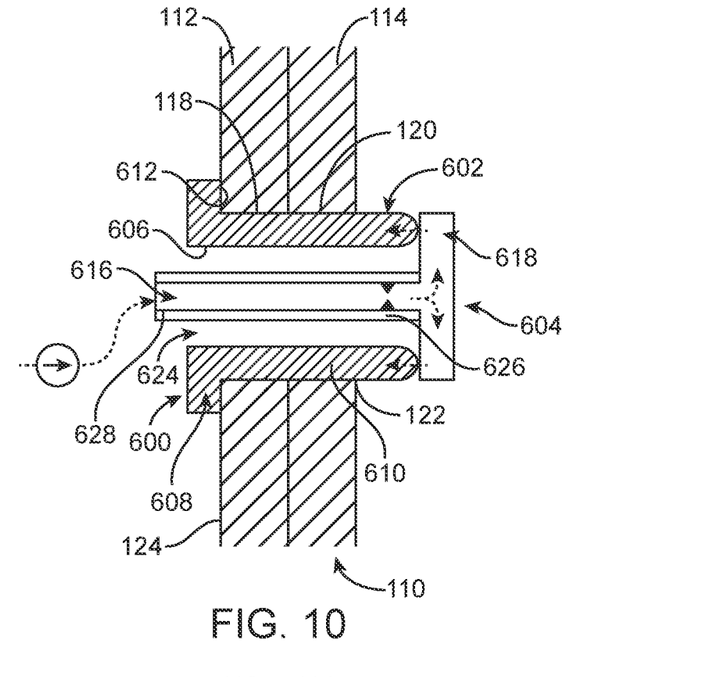
FIG. 10 is a side view of a bucked-type rivet securing together a stack of workpieces, shown at a cross-section through a plane parallel to the bucked-type rivet, according to an illustrative embodiment.
Figure 11:
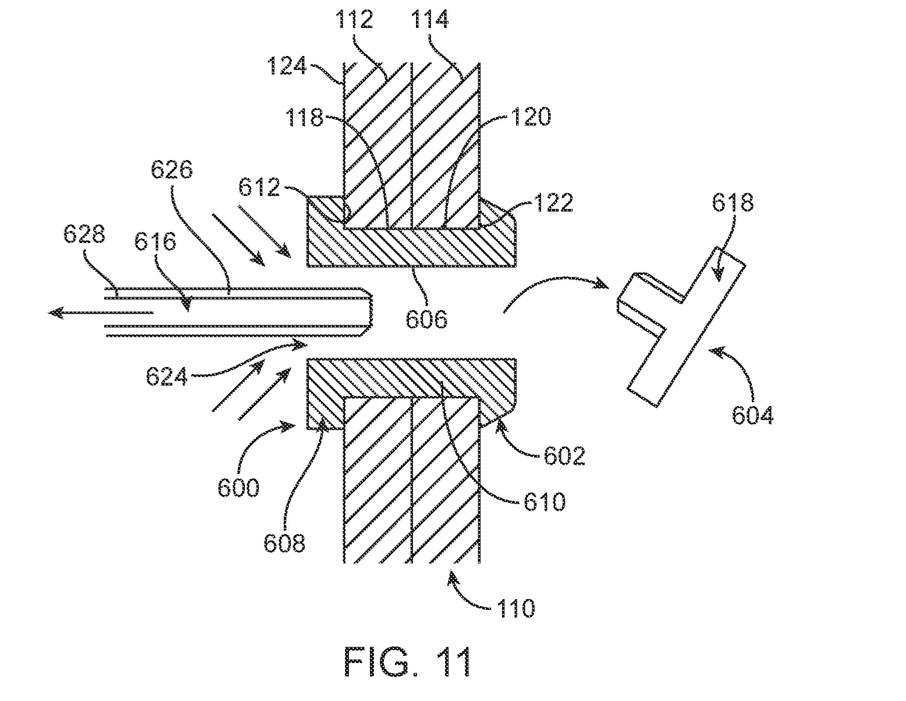
FIG. 11 is a side view of the bucked-type rivet of FIG. 10 after separating the forming piece, according to an illustrative embodiment.

In the illustrative embodiment of FIGS. 9-11, the rivet piece 602 is heated, at 906, by passing current through an electrical circuit that includes the puller shaft 616, the forming head 618, and the rivet piece 602, arranged in series. The electrical circuit is completed by the rivet tool 622 (see FIG. 8), which is in contact with both the puller shaft 616 and the head 608 of the rivet piece 602. As shown in FIGS. 10-11, the puller shaft 616 is separated from the rivet piece 602 by an annular gap 624 and an insulating layer, shown as layer 626, that is disposed on a surface of the forming piece, shown as cylindrical outer surface 628. The layer 626 prevents the electrical circuit from shorting across the annular gap between the forming piece 604 and the rivet piece 602 during the heating stage.

In the method 900 of FIG. 9, the rivet tool 622 (see FIG. 8) is configured to pull on the second end of the forming piece 604 while simultaneously passing a current through the electrical circuit, at 908. Among other benefits, the method of using an electrical current to heat the rivet piece 602 is fast, controllable, and heats the rivet piece 602 directly rather than indirectly. Once heated, the rivet piece 602 begins to thermoplastically deform proximate to the interface between the rivet piece 602 and the forming head 618, compressing together each of the metal plates 112, 114. The method 900 further includes breaking the interface shaft, at 910. As shown in FIG. 11, the notch 620 in the puller shaft 616 is dimensioned so that at a known load the forming head 618 separates from the puller shaft 616. The forming piece 604 is then removed from the rivet assembly 600, leaving behind the rivet piece 602. In the embodiment of FIGS. 10-11, the current is switched off to allow the rivet piece 602 to cool to a hardened fully amorphous state prior to or during separation of the forming head 618 from the puller shaft 616.

A gas or liquid delivery system (not shown) may be coupled to the rivet tool 622 to help quench the rivet piece 602 after the heating stage. Among other benefits, a rapid quench prevents devitrification of the BMG during the cooling stage. The rivet tool 622 may be configured to provide and circulate a stream of gas (e.g., nitrogen, an inert gas, etc.) or liquid (e.g., water) through the annular gap 624 between the forming piece 604 and the rivet piece 602. The rivet tool 622 may be configured to administer the gas or liquid beginning at approximately the same time as the current is switched off or just before the current is switched off to shorten the overall duration of the installation process.

In an illustrative embodiment, the rivet piece 602 may be configured to thermoplastically deform on both sides of the stack 110 to achieve very low profiles of the rivet piece 602 on either side of the stack 110. For example, in an illustrative embodiment the rivet piece 602 is a shaft (e.g., a solid shaft of approximately the same geometry as the aperture 116) that is deformed by placing a forming head against the rivet piece 602 on either side of the stack 110 (e.g., placing a first forming head of a first forming piece against the rivet piece 602 proximate to the second metal plate 114, and placing a second forming head of a second forming piece against the rivet piece 602 proximate to the first metal plate 112). Among other benefits, forming the rivet piece 602 from both sides creates a joint with as little gap as possible (e.g., a hermetic seal) between the rivet piece 602 and both the metal plates 112, 114. Furthermore, unlike traditional steel rivets whose microstructure is altered during the forming process, the heated BMG may be readily formed into a variety of shapes without altering the material properties (e.g., strength, etc.) of the BMG.

A bucked-type rivet made from BMG may be formed in one of a variety of different shapes and sizes. In an illustrative embodiment (not shown), at least one of the first and second aperture 118, 120 have an irregular shape in cross-section (e.g., square, oval, T-shape, cross, or a larger opening of any shape). The bucked-type rivet may also be irregularly shaped to accommodate the geometry of the resulting aperture 116 before forming, resulting in improved contact force mechanics between the bucked-type rivet and the workpieces being joined (e.g., the metal plates 112, 114). Alternatively, the bucked-type rivet may take the form of two separate rivet plates. The rivet plates are placed on opposite sides of the stack 110. Heat and pressure are applied to each rivet plate from either side of the stack 110 to form the rivet plates together through any openings between the workpieces. Such a configuration is particularly beneficial when a hermetic seal is desired along the joint.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other with a separate intervening member and any additional intermediate members coupled with one another, or with the two members coupled to each other with an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A bucked-type rivet assembly comprising:
   a formable member made from an amorphous metal alloy, the formable member having a channel; and
   an anvil at least partially disposed in the channel, the anvil comprising:
      an interface shaft; and
      an anvil head disposed on a first end of the interface shaft;
   wherein:
      the formable member is configured to secure a first member in position relative to a second member;
      the anvil head is configured to plastically deform the formable member proximate to the second member; and
      the anvil head is configured to separate from the interface shaft upon application of a predetermined tensile force to the interface shaft; and
   an insulating layer disposed in a gap formed between the anvil and the formable member so as to prevent electrical shorting across the gap.

2. The bucked-type rivet assembly of claim 1, wherein the amorphous metal alloy comprises a bulk metallic glass (BMG) alloy.

3. The bucked-type rivet assembly of claim 2, wherein the BMG alloy is characterized by a supercooled liquid region $\Delta Tx=Tx-Tg$ within a range between 20° C. and 130° C.

4. The bucked-type rivet assembly of claim 1, wherein the amorphous metal alloy comprises a zirconium that is alloyed with at least one of Yttrium or Scandium.

5. The bucked-type rivet assembly of claim 1, wherein the formable member comprises a cylindrical extension that defines the channel and a head disposed on an end of the cylindrical extension.

6. The bucked-type rivet assembly of claim 5, wherein the head forms a dome shape having a substantially planar lower surface where the head engages the cylindrical extension.

7. The bucked-type rivet assembly of claim 1, wherein the anvil is made from an electrically conductive material, and wherein the anvil head is electrically connected to the formable member.

8. The bucked-type rivet assembly of claim 1, further comprising an annular gap between the formable member and the anvil, wherein the annular gap is configured to receive one of a gas and a liquid for cooling of the formable member.

9. The bucked-type rivet assembly of claim 1, wherein the formable member is configured to plastically deform by one of rapidly spinning the anvil and applying ultrasonic energy to the anvil.

10. The bucked-type rivet assembly of claim 1, wherein a perimeter of the formable member is shaped to approximately match a perimeter of one of a first aperture of the first member and a second aperture of the second member.

11. The bucked-type rivet assembly of claim 1, wherein the anvil is made from an electrically conductive material, and wherein a cross-sectional area of the interface shaft is greater than a cross-sectional area of a portion of the formable member that surrounds the interface shaft.

12. The bucked-type rivet assembly of claim 1, wherein the anvil is made from one of (i) a steel alloy having an electrical conductivity of approximately 10% of the International Annealed Copper Standard (IACS) or (ii) a copper beryllium alloy having an electrical conductivity within a range between approximately 15-45% IACS.

13. The bucked-type rivet assembly of claim 1, wherein the anvil further comprises a conductive pathway disposed in the interface shaft.

14. The bucked-type rivet assembly of claim 13, wherein the interface shaft defines an opening, the conductive pathway comprising a wire that is disposed within the opening.

15. The bucked-type rivet assembly of claim 1, wherein the interface shaft includes a notch disposed at an axial position that is proximate to the anvil head and that extends around a perimeter of the interface shaft.

16. The bucked-type rivet assembly of claim 1, wherein the anvil head forms one of a "U" shape or a "T" shape when viewed in cross section.

17. A method of installing the bucked-type rivet assembly of claim 1, the method comprising:
   inserting the formable member made from the amorphous metal alloy through a first aperture in a first member and a second aperture in a second member;
   inserting the anvil into the channel in the formable member, the anvil comprising the interface shaft, the anvil head disposed on the first end of the interface shaft, and the insulating layer disposed on an outer surface of the interface shaft in the gap formed between the anvil and the formable member so as to prevent electrical shorting across the gap, the anvil head configured to separate from the interface shaft upon application of a predetermined tensile force to the interface shaft;

passing a current through an electrical circuit comprising the interface shaft, the anvil head, and the formable member;

pulling on the interface shaft to deform a portion of the formable member; and breaking the interface shaft.

18. The method of claim 17, further comprising passing a gas or a liquid through an annular gap between the formable member and the anvil.

19. The method of claim 17, wherein pulling on the interface shaft comprises applying a force to the interface shaft at the same time as passing the current through the electrical circuit.

20. The method of claim 17, further comprising engaging a rivet tool with the interface shaft and a head of the formable member to form the electrical circuit between the interface shaft, the anvil head, and the formable member.

\* \* \* \* \*